(12) United States Patent
Peng

(10) Patent No.: US 11,058,525 B2
(45) Date of Patent: Jul. 13, 2021

(54) METHOD FOR DETECTING ATTACHMENT HEAD INSTALLATION AND REMOVAL

(71) Applicant: KONINKLIJKE PHILIPS N.V., Eindhoven (NL)

(72) Inventor: Meng Peng, Bothell, WA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 184 days.

(21) Appl. No.: 16/326,236

(22) PCT Filed: Aug. 15, 2017

(86) PCT No.: PCT/EP2017/070691
§ 371 (c)(1),
(2) Date: Feb. 18, 2019

(87) PCT Pub. No.: WO2018/033547
PCT Pub. Date: Feb. 22, 2018

(65) Prior Publication Data
US 2020/0121431 A1 Apr. 23, 2020

Related U.S. Application Data

(60) Provisional application No. 62/377,055, filed on Aug. 19, 2016.

(51) Int. Cl.
| | |
|---|---|
| *A61C 17/22* | (2006.01) |
| *A61C 17/34* | (2006.01) |
| *G05B 15/02* | (2006.01) |
| *B26B 19/38* | (2006.01) |

(52) U.S. Cl.
CPC ........ *A61C 17/221* (2013.01); *A61C 17/3418* (2013.01); *A61C 17/3445* (2013.01); *G05B 15/02* (2013.01); *B26B 19/388* (2013.01); *B26B 19/3813* (2013.01)

(58) Field of Classification Search
CPC .............. A61C 17/221; A61C 17/3418; A61C 17/3445; G05B 15/02
See application file for complete search history.

(56) References Cited

U.S. PATENT DOCUMENTS

| | | | |
|---|---|---|---|
| 7,627,922 B2 * | 12/2009 | Miller ................ | A61C 17/3418 15/22.1 |
| 9,310,822 B2 * | 4/2016 | Osako ....................... | G05F 1/67 |
| 2003/0101526 A1 | 6/2003 | Hilscher et al. | |

(Continued)

FOREIGN PATENT DOCUMENTS

| | | |
|---|---|---|
| WO | 2015159250 A1 | 10/2015 |
| WO | 2016079660 A1 | 5/2016 |

*Primary Examiner* — Nathaniel C Chukwurah

(57) ABSTRACT

A drivetrain assembly (100, 200) for a personal care device (10), the drivetrain assembly including a resonator (110) connected to a transmission component (24) configured to transmit oscillations to the removable attachment; and a drive coil (120) configured to oscillate the resonator in a first direction; where the drive coil is configured to generate an installation or removal signal in response to installation or removal of the removable attachment, the installation or removal of the removable attachment generating movement of the resonator in a second direction; and where the drivetrain assembly is configured to communicate the generated signal to a controller.

13 Claims, 6 Drawing Sheets

(56) References Cited

U.S. PATENT DOCUMENTS

| | | | |
|---|---|---|---|
| 2005/0033544 A1* | 2/2005 | Brooks | G01V 15/00 702/128 |
| 2007/0157404 A1 | 7/2007 | Brewer et al. | |
| 2008/0022501 A1* | 1/2008 | Hilscher | A61C 17/221 29/401.1 |
| 2009/0243520 A1 | 10/2009 | Kashiwabara et al. | |
| 2010/0109580 A1 | 5/2010 | Lumbantobing et al. | |
| 2016/0015492 A1* | 1/2016 | Skaanland | A61C 17/221 15/22.2 |

* cited by examiner

_US 11,058,525 B2_

METHOD FOR DETECTING ATTACHMENT HEAD INSTALLATION AND REMOVAL

CROSS-REFERENCE TO PRIOR APPLICATIONS

This application is the U.S. National Phase application under 35 U.S.C. § 371 of International Application No. PCT/EP2017/070691, filed on Aug. 15, 2017, which claims the benefit of U.S. Provisional Patent Application No. 62/377,055, filed on Aug. 19, 2016. These applications are hereby incorporated by reference herein.

FIELD OF THE INVENTION

The present disclosure is directed generally to a method for detecting the installation or removal of the attachment head of a personal care device.

BACKGROUND

Electric personal care devices, such as electric toothbrushes, skin cleaners, personal groomers and shavers have been shown to greatly increase the efficacy of a cleaning session.

These electric personal care devices have motor that engages a drivetrain in order to drive an attachment in an oscillating, reciprocating, or other pattern. The devices also include a resonator, which is a component of the drivetrain that converts the oscillatory force of the motor into rotational movement. The actuation force excites the resonance of the system, which in turn drives the attachment head. The attachment is typically the cleaning or grooming mechanism, such as a toothbrush head, a shaver cutting device, a grooming cutting head or a skin-cleaning brush head.

In most personal care devices, the oscillating or reciprocating attachment is removable and replaceable. For example, an attachment may be removed temporarily when cleaning the device, or attaching an attachment head with a different function (i.e. a tongue cleaning brush head vs. a toothbrush head), or it may be removed permanently to be replaced with a new or different attachment. If the personal care device is activated while the attachment is removed, the system is no longer fine-tuned and can generate additional and unwanted sounds and/or vibrations, thus reducing performance reliability and negatively impacting the user's experience.

Accordingly, there is a need for personal care devices that can detect whether an attachment has been installed or removed, and that can respond to that state accordingly.

SUMMARY OF THE INVENTION

The present disclosure is directed to inventive methods for detecting the installation or removal of the removable or replaceable attachment of a personal care device, Applied to an electric or power personal care device such as an electric toothbrush or shaver, the inventive systems provide a mechanism for modifying operation of the personal care device depending on the detecting status of the removable or replaceable attachment. The drivetrain assembly of the personal care device typically comprises a resonator suspended in a frame. When an attachment is installed or removed, the resonator moves relative to the plane of the head's oscillation. The resonator then moves back to the original position in an oscillation decay. The movement of the magnets on the resonator creates an electromotive force in the driving coil, which is detected by the drivetrain assembly and interpreted as attachment installation or removal. The system can then implement various actions depending on the install state of the attachment. For example, the device can implement different operating conditions based on the attachment status in order to reduce unwanted noise and vibrations that can accompany operation without an installed attachment. The device may also institute a self-tuning process when it detects that a new attachment has been installed.

Generally in one aspect, a drivetrain assembly for a personal care device is provided. The drivetrain assembly includes a resonator connected to a transmission configured to transmit oscillations to the removable attachment; and a drive coil configured to oscillate the resonator in a first direction; wherein the drive coil is configured to generate an installation or removal signal in response to installation or removal of the removable attachment member, wherein the installation or removal of the removable attachment member generates movement of the resonator in a second direction; wherein the drivetrain assembly is configured to communicate the generated signal to a controller.

According to an embodiment, the second direction is perpendicular to the first direction.

According to an embodiment, the controller is configured to interpret the signal as installation or removal of the removable attachment.

According to an embodiment, the controller is further configured to filter out a component of the received signal, the component comprising a signal generated by oscillations of the resonator in the first direction.

According to an embodiment, the controller is further configured to perform a wake-up function in response to receiving the generated signal.

According to an embodiment, the controller is further configured to determine, based on the received signal, which of a plurality of users is installing or removing the removable attachment.

According to another aspect is a personal care device. The personal care device includes a controller; a removable attachment; and a drivetrain assembly, the drivetrain assembly comprising a resonator connected to a transmission configured to transmit oscillations to the removable attachment; and a drive coil configured to oscillate the resonator in a first direction; wherein the drivetrain assembly is configured to generate a signal in response to installation or removal of the removable attachment, wherein the installation or removal of the removable attachment generates movement of the resonator in a second direction; wherein the controller is configured to receive the generated signal and further configured to interpret the signal as installation or removal of the removable attachment.

According to an embodiment, the drive coil generates the signal in response to installation or removal of the removable attachment.

According to another aspect is a method for detecting installation or removal of a removable attachment member of a personal care device, the method comprising the steps of: (i) providing a personal care device comprising a removable attachment member, a resonator connected to a transmission configured to transmit oscillations to the removable attachment, and a drive coil configured to oscillate the resonator in a first direction; (ii) generating an installation or removal signal, wherein the installation or removal signal is generated by movement of the resonator in a second direction in response to installation or removal of the removable attachment (iii) communicating the generated installation or removal signal to a controller of the personal care device;

and (iv) interpreting, by the controller, the generated signal as installation or removal of the removable attachment by a user.

According to an embodiment, the method further includes the step of filtering, by the controller, a component of the received signal, the component comprising a signal generated by oscillations of the resonator in the first direction.

According to an embodiment, the method further includes the step of activating, by the personal care device, a wake-up function in response to receiving the generated signal.

According to an embodiment, the method further includes the step of determining, based on the received signal, which of a plurality of users is installing or removing the removable attachment.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method for detecting the installation or removal of the removable or replaceable attachment of a personal care device. More generally, Applicant has recognized and appreciated that it would be beneficial to provide a personal care device that responds to the install state of a removable attachment. Accordingly, the systems described or otherwise envisioned herein provide a personal care device, such as an electric toothbrush, skin cleaner, grooming device, or shaver, with a drivetrain assembly comprising a resonator suspended in a frame. When an attachment is installed or removed, the resonator moves relative to the direction of the attachment's oscillation. The resonator then moves back to the original position in an oscillation decay. The movement of the magnets on the resonator creates an electromotive force in the driving coil, which is detected by the drivetrain assembly and interpreted as attachment installation or removal.

According to various embodiments, the systems described or otherwise envisioned herein implement various actions depending on the detected install state of the attachment. For example, the device can implement different operating conditions based on the attachment status in order to reduce unwanted noise and vibrations that can accompany operation without an installed attachment. The device may also institute a self-tuning process when it detects that a new attachment has been installed.

A particular goal of utilization of the embodiments and implementations herein is to provide a drivetrain assembly for an personal care device such as, e.g., a Philips Sonicare™ toothbrush (manufactured by Koninklijke Philips Electronics, N.V.), although the assembly may be utilized with many other personal care devices, including tongue scrapers, flossers, shavers, and many other devices.

Figure 1:
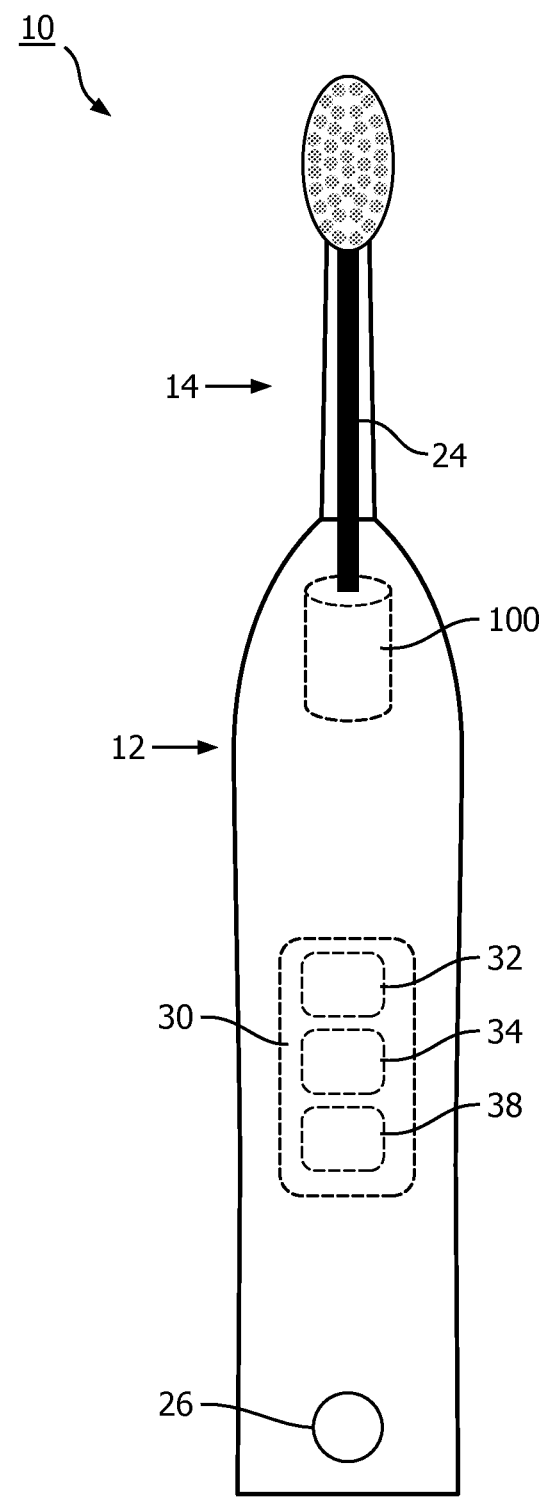
FIG. 1 is a schematic representation of a personal care device, in accordance with an embodiment.

Referring to FIG. 1, in one embodiment, an personal care device 10 is provided that includes a body portion 12 and an attachment 14. Attachment 14 may include at its end remote from the body portion a brush head 16, such as shown here, or other cleaning or grooming attachment.

Attachment 14 is mounted so as to be able to move relative to the body portion 12. The movement can be any of a variety of different movements, including vibrations or rotation, among others.

The body portion 12 typically contains a drivetrain 100, 200 with a motor for generating movement and a transmission component 24, or drive train shaft, for transmitting the generated movements to attachment 14. For example, drivetrain 100, 200 comprises a motor or electromagnet(s) that generates movement of a transmission component 24, which is subsequently transmitted to the attachment 14. Drivetrain 100, 200 can include components such as a motor, a power supply, an oscillator, and one or more electromagnets, among other components. In this embodiment the power supply comprises one or more rechargeable batteries, not shown, which can, for example, be electrically charged in a charging holder in which personal care device 10 is placed when not in use. According to one embodiment, attachment 14 is mounted to the drive train shaft 24 so as to be able to vibrate relative to body portion 12. The attachment 14 is detachably mounted so that attachment 14 can be replaced with a different attachment for different operating features, or when one or more components of the attachment are worn out and require replacement.

The body portion 12 is further provided with a user input 26 to activate and de-activate the drivetrain 100, 200. The user input 26 allows a user to operate the personal care device 10, for example to turn the personal care device 10 on and off. The user input 26 may, for example, be a button, touch screen, or switch.

The body portion 12 of the device may also comprise a controller 30. Controller 30 may be formed of one or multiple modules, and is configured to operate the personal care device 10 in response to an input, such as input obtained via user input 26. Controller 30 can comprise, for example, a processor 32 and a memory 34, and can optionally include a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of personal care device 10. According to an embodiment, connectivity module 38 transmits data, and can be any module, device, or means capable of transmitting a wired or wireless signal, including but not limited to a Wi-Fi, Bluetooth, near field communication, and/or cellular module.

Figure 2:
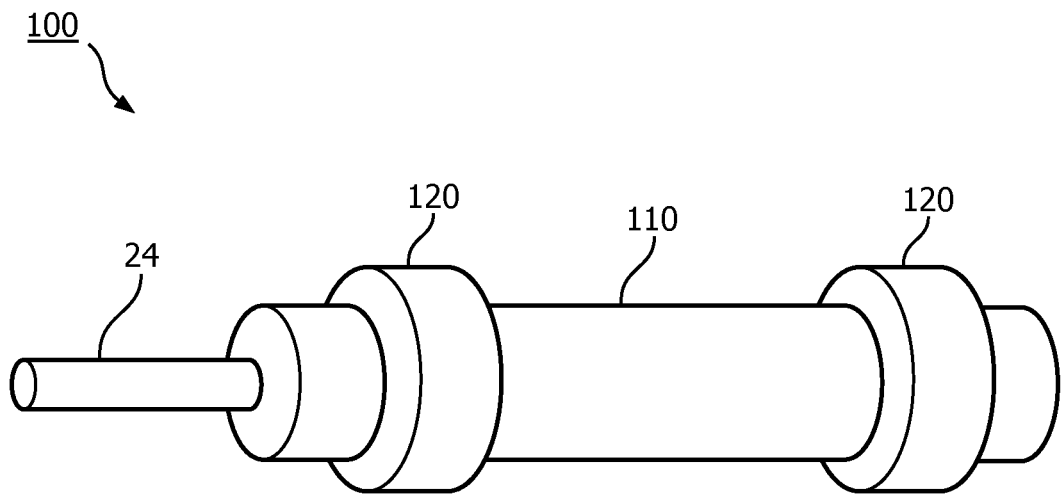
FIG. 2 is a schematic representation of a drivetrain assembly of a personal care device, in accordance with an embodiment.
Figure 3:
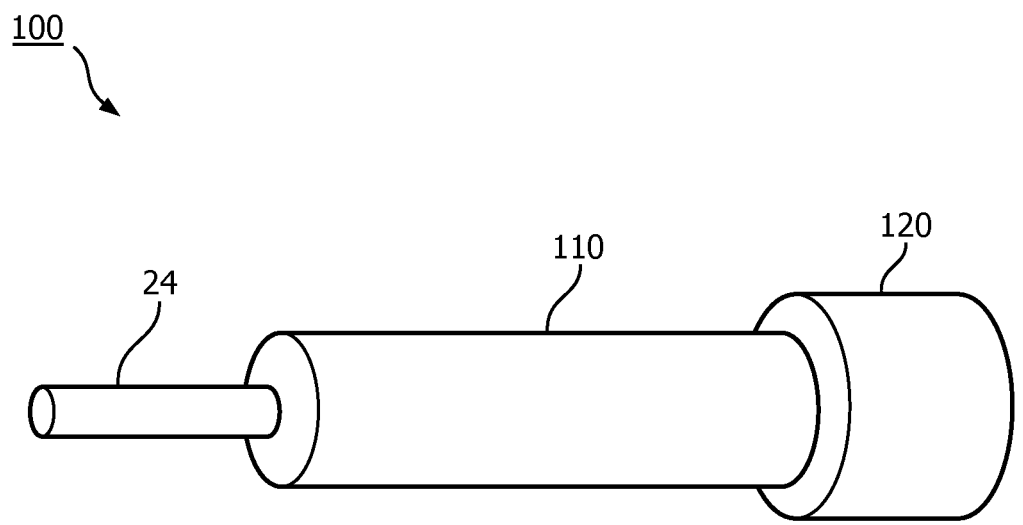
FIG. 3 is a schematic representation of a drivetrain assembly of a personal care device, in accordance with an embodiment.

Referring to FIG. 2, in one embodiment, is a simple drivetrain assembly 100 of a personal care device 10 which comprises an electromagnetic drive system. The drivetrain assembly 100 comprises a resonator 110 which can be, for example, suspended within an electromagnetic actuator. For example, the drivetrain assembly 100 can comprise one or more magnetic drive coils 120, which function as an actuator configured to exert a rotational electromagnetic force on the resonator 110. In FIG. 2, in one embodiment, the resonator 110 is circular and is suspended within a surrounding drive coil 120. In FIG. 3, in one embodiment, the resonator interacts at one end with the magnetic drive coil 120. All or part of the resonator 110 may be a spring, such as a torsional spring, that enables or enhances oscillation of the drivetrain assembly.

At one end of the resonator 110 is a transmission component, in this case shown as an elongated shaft 24, which connects or otherwise interacts with an attachment 14. Oscillation of the resonator 110 is communicated to the drive train shaft 24, which in turn is communicated to the attachment 14 (shown in FIG. 1).

Figure 4:
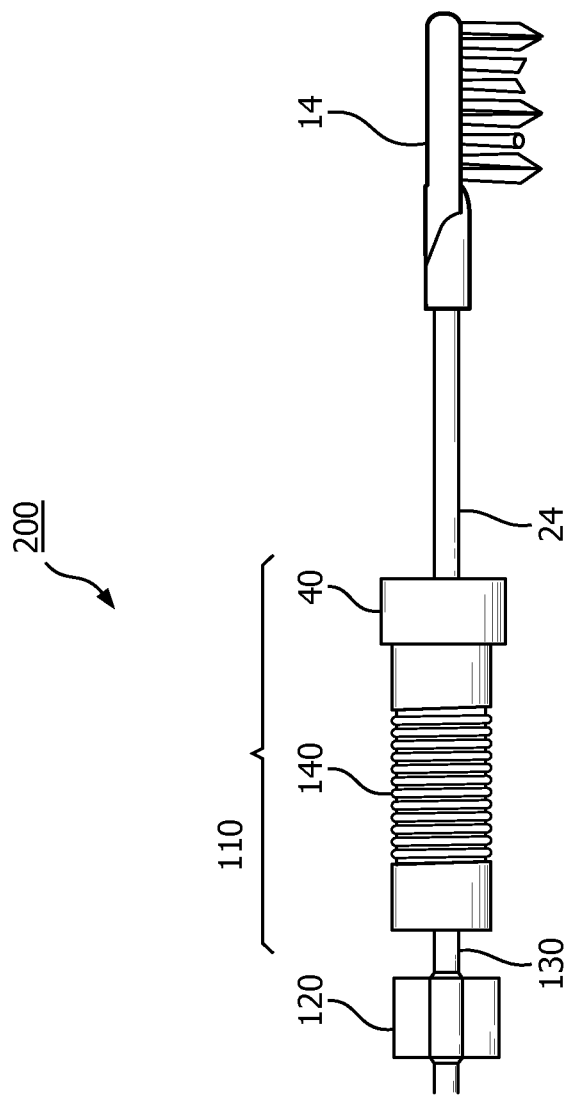
FIG. 4 is a schematic representation of a drivetrain assembly of a personal care device, in accordance with an embodiment.

Referring to FIG. 4, in one embodiment, is a drivetrain assembly 200 of a personal care device comprising an electromagnetic drive system. This embodiment of the drivetrain assembly 200 is a resonant system in which the drive system is driven by an electromagnetic motor 120 at a frequency which is at or very close to the resonant frequency of the mechanical drive system. Accordingly, the drivetrain assembly 200 comprises an elongated drive shaft 24 which communicates oscillations to a removable attachment 14. At the end opposite from the attachment, the elongated drive shaft is connected to or otherwise interacts with an output mass 40.

Drivetrain assembly 200 comprises a resonator 110 which can be, for example, suspended within an electromagnetic actuator. According to this embodiment, a portion of the resonator 110 is a shaft 130 and a portion of the resonator is a spring assembly 140 which couples an electromagnetic motor 120 to the output mass 40 and/or the elongated shaft 24. The spring assembly 140 maybe be suspended between the electromagnetic motor 120 and the output mass 40 and/or the elongated shaft 24, or the spring assembly 140 maybe be nodally mounted to the housing 12.

According to an embodiment, the electromagnetic drive coils or motor 120 in FIGS. 2-4 are connected to the controller 30 such that signals can be communicated between the electromagnetic drive coils or motor 120 and the controller 30. The controller sends signals to the electromagnetic drive coils or motor 120 which causes the one or more magnets of the motor to oscillate the resonator 110. As described herein, however, the controller 30 can also receive signals from the electromagnetic drive coils or motor 120 when the suspended resonator moves in a direction other than the direction of the oscillatory movement of the resonator. This movement of the resonator induces an electromagnetic signal in the drive coils or motor which can then be detected and interpreted by the controller 30. According to one embodiment, the resonator moves in a direction perpendicular to the functional oscillatory movement of the resonator. According to another embodiment, the resonator moves in a direction other than perpendicular to the functional oscillatory movement of the resonator.

Figure 5:
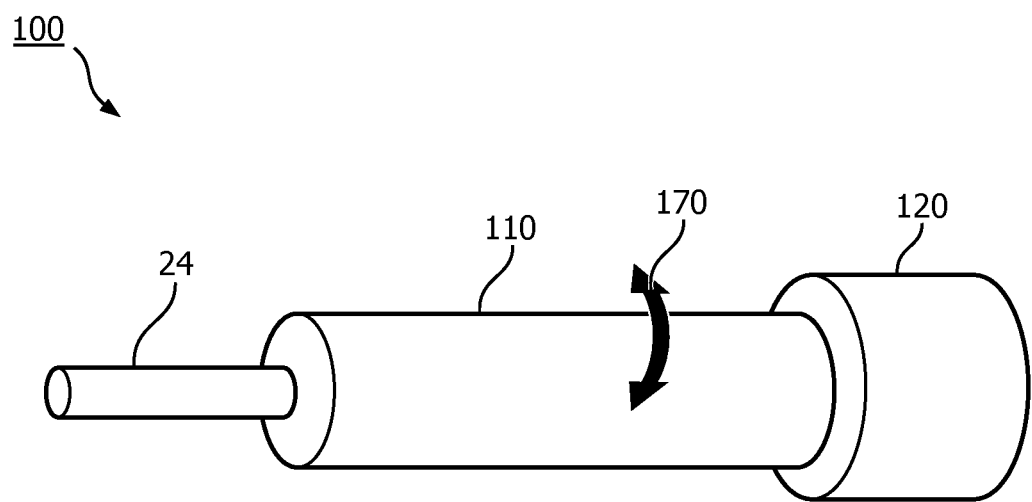
FIG. 5 is a schematic representation of a drivetrain assembly of a personal care device, in accordance with an embodiment.

Referring to FIG. 5, in one embodiment, is a drivetrain assembly 100 in which an oscillatory force is exerted on the resonator 110. This force, exerted by the magnetic interaction between one or more magnets or driving coils of the electromagnetic motor 120 and one or more magnets of the resonator 110, causes the resonator to oscillate back and forth around the central axis of the resonator, as indicated by arrow 170. The oscillations 170 of the resonator are communicated to the elongated drive shaft 24, which in turn communicates the oscillations to the attachment 14 (not shown) where the cleaning, scrubbing, flossing, shaving, grooming, or other action occurs.

Figure 6:
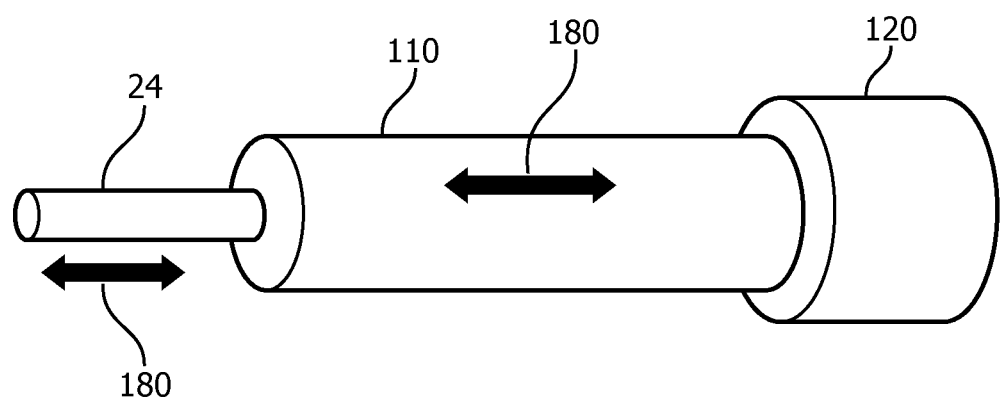
FIG. 6 is a schematic representation of a drivetrain assembly of a personal care device, in accordance with an embodiment.

Referring to FIG. 6, in one embodiment, is a drivetrain assembly 100 in which an installation or removal force 180 is exerted on the system. For example, a user may determine that an attachment 14 should be removed for cleaning or replaced with a new attachment. The user exerts a removal force 180 on the attachment, which pulls the elongated drive shaft 24 and the resonator 110 in a second direction relative to the oscillation force 170 of the drivetrain assembly shown in FIG. 5, including but not limited to a perpendicular direction, such as shown in FIG. 6. This movement of the resonator 110 temporarily produces a relative movement between the one or more magnets of the resonator 110 and the driving coil 120, which creates electromotive forces in the driving coil 120. The electromotive force produces a signal which can be communicated to the controller 30.

Similarly, when the user determines that a cleaned attachment or a new attachment 14 should be installed, the user exerts an installation force 180 on the attachment, which pushes the elongated drive shaft 24 and the resonator 110 in a second direction relative to the oscillation force 170 of the drivetrain assembly, including but not limited to a perpendicular direction. This movement of the resonator 110 temporarily produces a relative movement between the one or more magnets of the resonator 110 and the driving coil 120, which creates electromotive forces in the driving coil 120. The electromotive force produces a signal which can be communicated to the controller 30.

Figure 7:
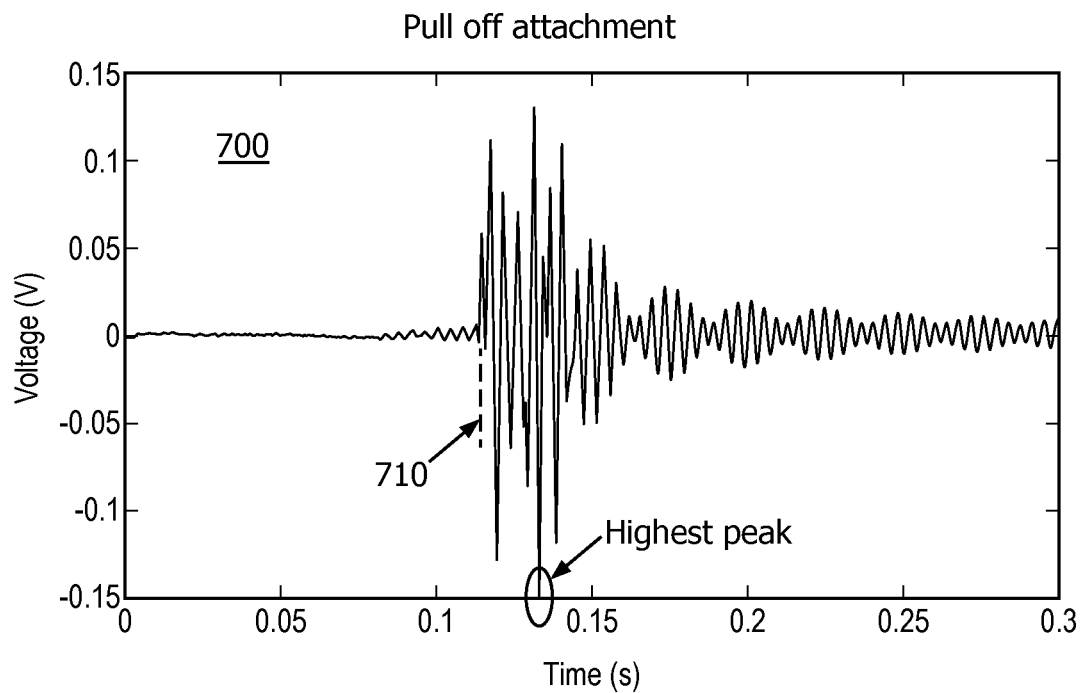
FIG. 7 is a graph of a voltage signal received from a drivetrain assembly of a personal care device, in accordance with an embodiment.

Referring to FIG. 7 is a graph 700 of the voltage of the driving coil, which can be monitored and/or detected by the controller. At time 710, the user is exerting a removal force 180 on the attachment, which pulls the elongated drive shaft and the resonator in a second direction relative to the oscillation force 170 of the drivetrain assembly, including but not limited to a perpendicular direction. This movement of the resonator temporarily produces a relative movement between the one or more magnets of the resonator and the driving coil, which creates electromotive forces in the driving coil to generate a voltage signal. As shown in FIG. 7, the voltage signal peaks quickly and then oscillates back to a lower level as the resonator oscillates within the driving coil in the second direction relative to the operational oscillation force 170.

Figure 8:
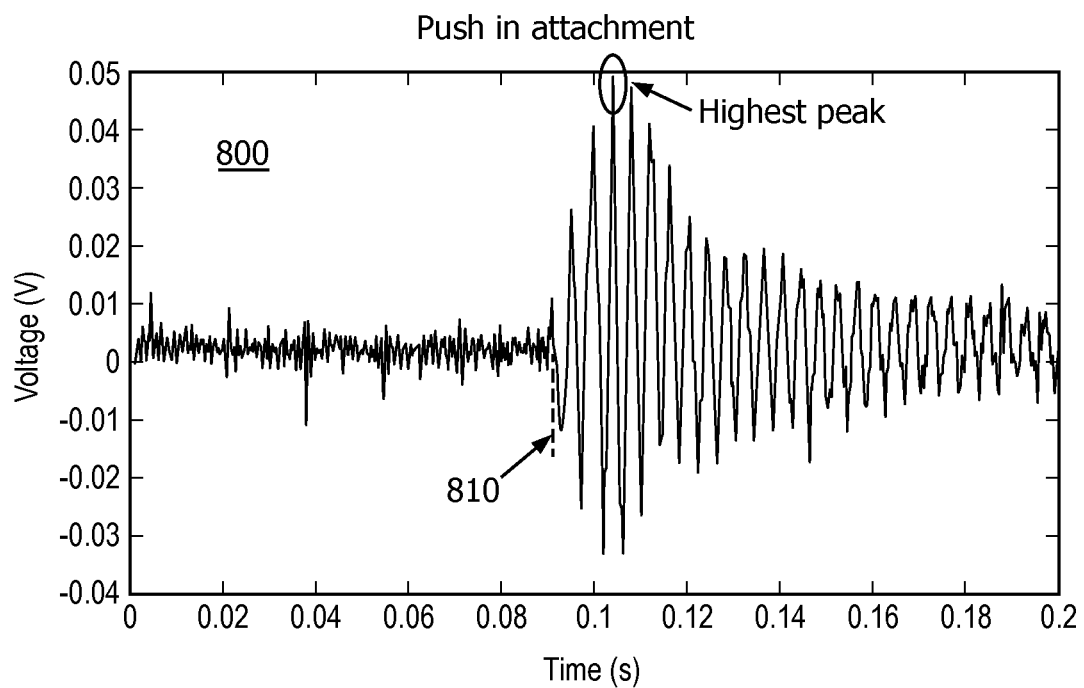
FIG. 8 is a graph of a voltage signal received from a drivetrain assembly of a personal care device, in accordance with an embodiment.

Referring to FIG. 8 is a graph 800 of the voltage of the driving coil, which can be monitored and/or detected by the controller. At time 810, the user is exerting an installation force 180 on the attachment, which pushes the elongated drive shaft and the resonator in a second direction to the oscillation force 170 of the drivetrain assembly, including but not limited to a perpendicular direction. This movement of the resonator temporarily produces a relative movement between the one or more magnets of the resonator and the driving coil, which creates electromotive forces in the driving coil to generate a voltage signal. As shown in FIG. 8, the voltage signal peaks quickly and then oscillates back to a lower level as the resonator oscillates within the driving coil in the second direction relative to the operational oscillation force 170.

According to an embodiment, and as indicated by comparing graphs 700 and 800, the controller 30 can be configured to distinguish between an installation force and a removal force. For example, the installation force and removal force may generate or otherwise result in different voltage signal profiles, such as seen in graphs 700 and 800, respectively, which can be detected and interpreted by the controller. In traditional systems, if the moment of inertia of the removable attachment is relatively small compared to the overall system moment of inertia, the natural frequency shift due to the presence or absence of the attachment will be very small and can be easily affected by noise. The systems and methods described herein, however do not experience this problem because detection is independent of the moment of inertia and the primary function and oscillation characteristics. Accordingly, pursuant to the systems and methods described herein, the personal care device can detect installation and removal of the attachment even if the drivetrain is generating the primary oscillations to move the attachment.

Figure 9:
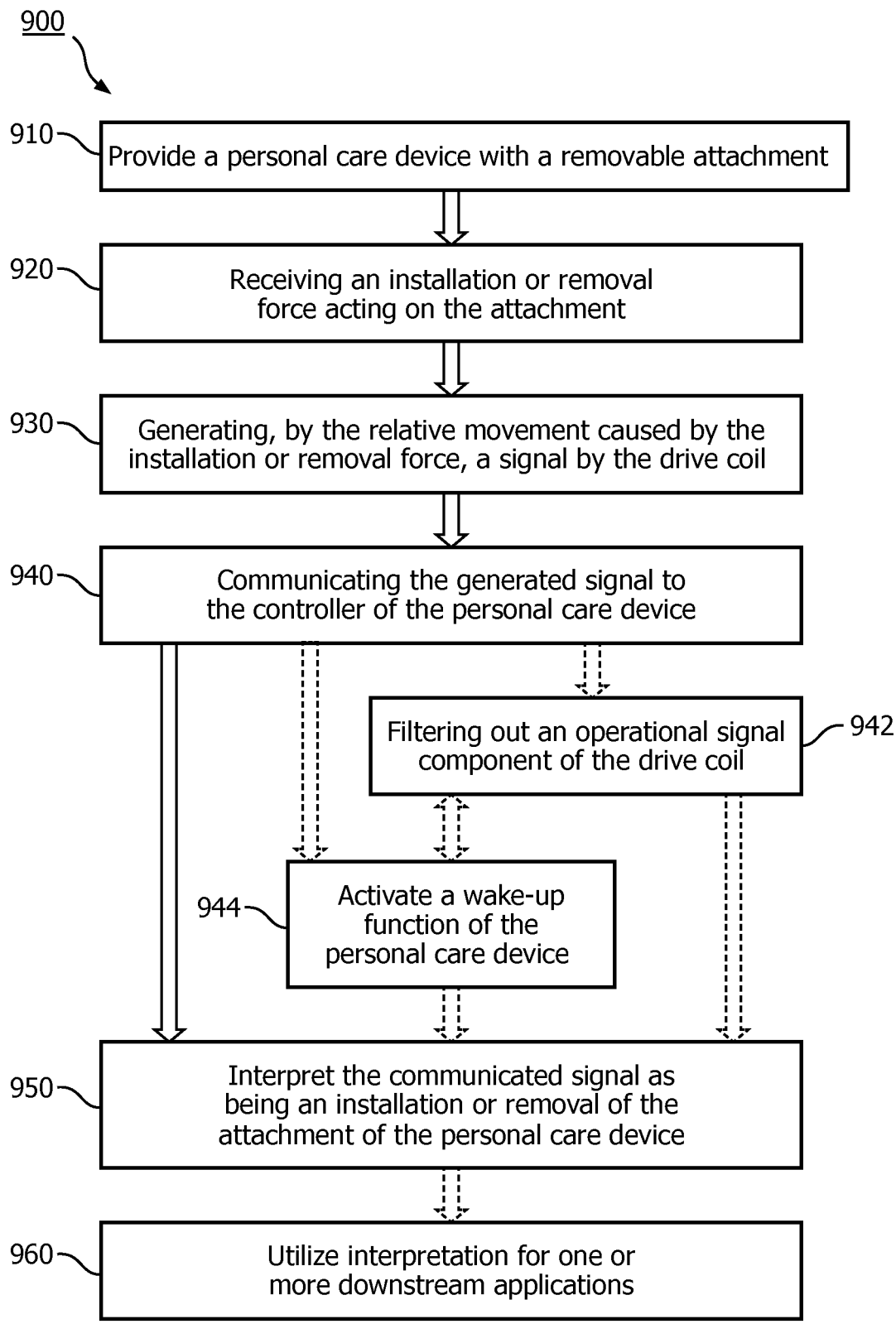
FIG. 9 is a flowchart of a method for detecting the installation or removal of the removable or replaceable attachment of a personal care device, in accordance with an embodiment.

Referring to FIG. 9, in one embodiment, is a method 900 for detecting the installation or removal of the removable or replaceable attachment of a personal care device 10. At step 910 of the method, a personal care device is provided. The personal care device 10 can be any of the personal care devices described or otherwise envisioned herein, including but not limited to an oral care device, a shaver, a groomer, a flosser, a skincare device, or any of a wide variety of other devices with a removable and/or replaceable attachment. For example, the personal care device 10 may comprise a body portion 12 and a removable and/or replaceable attachment 14. The personal care device 10 may comprise a drivetrain 100, 200 with an electromagnetic drive coil or motor 120 for generating an oscillatory movement of a resonator 110, and a transmission component 24, or shaft, for transmitting the generated movements to attachment 14. The electromagnetic motor 120 is in communication with a controller 30 for receiving and sending an electric signal.

At step 920 of the method, the user exerts an installation or removal force 180 on the attachment 14. For example, the user may be removing a brush head 14 of a toothbrush to clean or replace the brush head. As another example, the user may be installing or placing a cutting head attachment 14 onto a shaver 10. For example, if the user is exerting a removal force 180 on the attachment by pulling, the elongated shaft 24 and the resonator 110 are pulled in a direction approximately perpendicular to the oscillation force 170 of the drivetrain assembly. If the user is exerting an installation force 180 on the attachment by pushing, the elongated shaft 24 and the resonator 110 are pushed in a direction approximately perpendicular to the oscillation force 170 of the drivetrain assembly. While the pulling and pushing forces move one or more components of the drivetrain assembly in opposite directions to one another, both directions are approximately perpendicular to the oscillation force 170 of the drivetrain assembly.

At step 930 of the method, a signal is generated in response to the movement of the resonator 110 relative to the drive coil 120. The movement of the resonator 110—either due to pushing (attachment installation) or pulling (attachment removal) by the user—temporarily produces a relative movement between the one or more magnets of the resonator and the driving coil, which creates electromotive forces in the drive coil to generate a voltage signal. Typically, the voltage signal peaks quickly and then oscillates back to a lower level as the resonator 110 oscillates within the drive coil 120 in the second direction relative to the operational oscillation force 170.

At step 940 of the method, the generated signal is communicated to the controller 30 of the personal care device 10. According to an embodiment, the drive coil 120 is in wired and/or wireless communication with the controller 30, and is configured to both receive signals from the controller and to send signals to the controller. For example, the drive coil 120 will receive signals from the controller 30 during normal operation of the personal care device in order to generate the oscillatory force 170.

At optional step 942 of the method, an operational signal component of the drive coil 120 is filtered out of the signal received by the controller in order to isolate and/or amplify the installation or removal signal component of the signal received by the controller. For example, the controller 30 may be programmed to filter the operational signal out of the signal. Alternatively, the drivetrain assembly, controller, or another aspect of the personal care device may comprise a filtering component to perform the signal processing. Any signal processing device or process may be used to remove the operational signal out of the signal, thereby reducing the background noise and enhancing detection and interpretation of the installation or removal signal component of the signal. According to another embodiment, the system may comprise a signal amplifier configured to amplify a portion or the entirety of the signal received by the controller.

At optional step 944 of the method, the signal generated in response to the movement of the resonator 110 relative to the drive coil 120 and communicated to the controller 30 of the personal care device activates a wake-up function or device or process that can wake up the system in response to the signal even when the device has been turned off. Accordingly, the device may be activated when a user installs or removes the attachment.

At step 950 of the method, the system interprets the communicated signal as an installation force or as a removal force. Differences in the strength, pattern, or other parameter of the communicated signal can indicate a wide variety of different events, forces, or actions to the system. For example, according to one embodiment of the system, a removal force may be higher than an installation force, wherein the peak and overall amplitudes resulting from removal are higher than those resulting from installation. Indeed, the highest peak amplitude of removal and installation might comprise opposite signs, indicating that the removal and installation directions are different. For example, in FIG. 7 the highest peak of the removal force is nearly −0.15, while in FIG. 8 the highest peak of the installation force is nearly +0.05. These are just examples, and many variations are possible.

Accordingly, other information can be extracted based on varying properties of the signals generated in response to the installation or removal force. For example, varying stiffness may lead to different frequencies and/or peak amplitudes. Varying damping of the system may lead to a different decay length of the generated signal. Many other variations and subsequent interpretations are possible. For example, if two users share a personal care device with their own attachment that is installed and removed for each use, the system can detect not only when the device is installed or removed, but can also detect which user is installing or removing their attachment based on one or more of a variety of possible parameters, including the amount of force and/or the oscillatory pattern.

At step 960 of the method, the determination of installation or removal of the attachment of the personal care device can be utilized for one or more downstream applications. For example, the information can be utilized to indicate that tuning of a new or re-installed attachment is necessary. Many other applications are possible with the determination of installation or removal of the attachment of the personal care device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of"

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A drivetrain assembly for a personal care device, the drivetrain assembly comprising:
  a resonator connected to a transmission component configured to transmit oscillations to the removable attachment; and
  a drive coil configured to oscillate the resonator in a first direction;
  wherein the drive coil is configured to generate an installation or removal signal in response to movement of the resonator in a second direction caused by motion of the removable attachment during its being installed or being removed;
  wherein the drivetrain assembly is configured to communicate the generated installation or removal signal to a controller.

2. The drivetrain assembly of claim 1, wherein the second direction of movement is perpendicular to the first direction of movement.

3. The drivetrain assembly of claim 1, wherein the installation or removal signal is to be interpreted by the controller as installation or removal of the removable attachment, respectively.

4. The drivetrain assembly of claim 1, wherein a component of the received installation or removal signal communicated from the drive train assembly is to be filtered out by the controller, the filtered component comprising a signal generated by oscillations of the resonator in the first direction.

5. The drivetrain assembly of claim 1, wherein the received installation or removal signal communicated from the drive train assembly is such that a determination can be made of which of a plurality of users is installing or removing the removable attachment.

6. A personal care device comprising:
a controller;
a removable attachment; and
a drivetrain assembly, the drivetrain assembly comprising a resonator connected to a transmission component configured to transmit oscillations to the removable attachment; and a drive coil configured to oscillate the resonator in a first direction;
wherein the drive coil is configured to generate a signal in response to movement of the resonator in a second direction caused by motion of the removable attachment when being installed or being removed;
wherein the controller is configured to receive the generated signal and further configured to interpret the signal as installation or removal of the removable attachment.

7. The personal care device of claim 6, wherein the second direction of movement is perpendicular to the first direction.

8. The personal care device of claim 6, wherein the controller is further configured to filter out a component of the received installation or removal signal communicated from the drive train assembly, the component comprising a signal generated by oscillations of the resonator in the first direction.

9. The personal care device of claim 6, wherein the controller is further configured to determine, based on the received signal, which of a plurality of users is installing or removing the removable attachment.

10. A method for detecting installation or removal of a removable attachment of a personal care device, the method comprising the steps of:
providing a personal care device comprising a removable attachment, a resonator connected to a transmission component configured to transmit oscillations to the removable attachment, and a drive coil configured to oscillate the resonator in a first direction;
generating an installation or removal signal, wherein the installation or removal signal is generated by the drive coil in response to movement of the resonator in a second direction caused by movement of the removable attachment being installed or being removed;
communicating the generated installation or removal signal to a controller of the personal care device; and
interpreting, by the controller, the generated signal as installation or removal of the removable attachment by a user.

11. The method of claim 10, wherein the second direction of movement is perpendicular to the first direction.

12. The method of claim 10, further comprising the step of filtering, by the controller, a component of the received signal, the component comprising a signal generated by oscillations of the resonator in the first direction.

13. The method of claim 10, further comprising the step of activating, by the personal care device, a wake-up function in response to receiving the generated signal.

* * * * *